(12) United States Patent
Graham et al.

(10) Patent No.: US 10,612,784 B2
(45) Date of Patent: Apr. 7, 2020

(54) NOZZLE ASSEMBLY FOR A DUAL-FUEL FUEL NOZZLE

(71) Applicant: General Electric Company, Schenectady, NY (US)

(72) Inventors: Kaitlin Marie Graham, Greenville, SC (US); Thomas Edward Johnson, Greer, SC (US); Geoffrey David Myers, Simpsonville, SC (US)

(73) Assignee: General Electric Company, Shenectady, NY (US)

( * ) Notice: Subject to any disclaimer, the term of this patent is extended or adjusted under 35 U.S.C. 154(b) by 270 days.

(21) Appl. No.: 15/626,461

(22) Filed: Jun. 19, 2017

(65) Prior Publication Data

US 2018/0363912 A1    Dec. 20, 2018

(51) Int. Cl.
| F23R 3/36 | (2006.01) |
|---|---|
| F02C 7/22 | (2006.01) |
| F23D 17/00 | (2006.01) |
| F23R 3/28 | (2006.01) |

(52) U.S. Cl.
CPC ............... *F23R 3/36* (2013.01); *F02C 7/222* (2013.01); *F23D 17/002* (2013.01); *F23R 3/283* (2013.01); *F23R 3/286* (2013.01)

(58) Field of Classification Search
CPC .. F23R 3/36; F23R 3/283; F23R 3/286; F23D 17/002; F23D 11/102; F23D 11/103; F23D 11/107; F23D 11/383; F23D 11/40; F23D 14/02; F02C 7/22
See application file for complete search history.

(56) References Cited

U.S. PATENT DOCUMENTS

| 2,786,331 A | 3/1957 | Williams |
|---|---|---|
| 4,258,544 A | 3/1981 | Gebhart et al. |
| 4,815,664 A | 3/1989 | Tuthill et al. |
| 5,408,830 A | 4/1995 | Lovett |
| 5,813,847 A | 9/1998 | Eroglu et al. |
| 6,076,356 A | 6/2000 | Pelletier |
| 6,178,752 B1 | 1/2001 | Morford |
| 6,311,473 B1 | 11/2001 | Benjamin et al. |
| 6,523,350 B1 | 2/2003 | Mancini et al. |
| 6,655,145 B2 | 12/2003 | Boardman |

(Continued)

FOREIGN PATENT DOCUMENTS

WO    WO2017034435 A1    3/2017

*Primary Examiner* — Arun Goyal
*Assistant Examiner* — Colin J Paulauskas
(74) *Attorney, Agent, or Firm* — Dority & Manning, P.A.

(57) ABSTRACT

The present disclosure is directed to a nozzle assembly including a header manifold and a ring manifold, which defines a liquid fuel plenum, spaced from the header manifold. An outer sleeve connects to the ring manifold, and a nozzle body connects to the outer sleeve. The ring manifold, the outer sleeve, and the nozzle body define a fluid chamber. An inner fuel tube extends from the header manifold to the nozzle body. A portion of the inner fuel tube extends helically about an axial centerline of the nozzle assembly between the ring manifold and the nozzle body. A first fuel tube extends helically around a portion of the inner fuel tube. The first fuel tube fluidly couples the liquid fuel plenum to the header manifold. A second fuel tube extends helically around a portion of the inner fuel tube and fluidly couples the liquid fuel plenum to the header manifold.

20 Claims, 8 Drawing Sheets

(56) References Cited

U.S. PATENT DOCUMENTS

| | | |
|---|---|---|
| 7,703,287 B2 | 4/2010 | Haggerty et al. |
| 8,281,595 B2 | 10/2012 | Davis, Jr. et al. |
| 8,418,469 B2 | 4/2013 | Myers et al. |
| 9,010,119 B2 | 4/2015 | Myers |
| 9,217,570 B2 | 12/2015 | Parsania et al. |
| 9,546,600 B2 | 1/2017 | Cihlar et al. |
| 2009/0111063 A1 | 4/2009 | Boardman et al. |
| 2009/0218421 A1 | 9/2009 | Kumaravelu |
| 2009/0293482 A1* | 12/2009 | Davis, Jr. ............ F23D 14/82 60/737 |
| 2010/0205970 A1 | 8/2010 | Hessler et al. |
| 2010/0307161 A1* | 12/2010 | Thomson ............ F23D 11/107 60/748 |
| 2011/0289933 A1* | 12/2011 | Boardman ............ F23R 3/14 60/776 |
| 2012/0073302 A1* | 3/2012 | Myers ............ F23D 11/402 60/748 |
| 2014/0116054 A1* | 5/2014 | Means ............ F23R 3/283 60/739 |
| 2014/0150434 A1* | 6/2014 | Belsom ............ F23R 3/286 60/739 |
| 2016/0169110 A1 | 6/2016 | Myers et al. |
| 2016/0258628 A1 | 9/2016 | Ginessin et al. |

\* cited by examiner

NOZZLE ASSEMBLY FOR A DUAL-FUEL FUEL NOZZLE

TECHNICAL FIELD

The subject matter disclosed herein relates to a fuel nozzle for a combustion system. More particularly, the disclosure is directed to a nozzle assembly for a dual-fuel fuel nozzle.

BACKGROUND

Gas turbines generally operate by combusting a fuel and air mixture in one or more combustors to create a high-energy combustion gas that passes through a turbine, thereby causing a turbine rotor shaft to rotate. The rotational energy of the rotor shaft may be converted to electrical energy via a generator coupled to the rotor shaft. Each combustor generally includes fuel nozzles that provide for delivery of the fuel and air upstream of a combustion chamber, using premixing of the fuel and air as a means to keep nitrogen oxide (NOx) emissions low.

Gaseous fuels, such as natural gas, often are employed as a combustible fluid in gas turbine engines used to generate electricity. In some instances, it may be desirable for the combustion system to be able to combust liquid fuels, such as distillate oil. A configuration with both gas and liquid fuel capability is called a "dual-fuel" combustion system. Certain dual-fuel type combustion systems operate using multiple dual-fuel primary or outer fuel nozzles annularly arranged around a center fuel nozzle. The outer dual-fuel fuel nozzles include liquid fuel injection cartridges that are breach loaded through an end cover of the combustor and that provide liquid fuel which may be used to start the engine, increase load and bring it up to full operating speed.

BRIEF DESCRIPTION

Aspects and advantages are set forth below in the following description, or may be obvious from the description, or may be learned through practice.

In one embodiment, the present disclosure is directed to a nozzle assembly. The nozzle assembly includes a header manifold and a ring manifold axially spaced from the header manifold. The ring manifold defines a liquid fuel plenum. The nozzle assembly also includes an outer sleeve connected to an aft side wall of the ring manifold and a nozzle body connected to an aft end of the outer sleeve. The ring manifold, the outer sleeve, and the nozzle body define a fluid chamber. The nozzle assembly further includes an inner fuel tube extending axially from the header manifold to the nozzle body. A portion of the inner fuel tube extends helically about an axial centerline of the nozzle assembly between the aft side wall of the ring manifold and the nozzle body. Additionally, the nozzle assembly includes a first fuel tube extending helically around a portion of the inner fuel tube. The first fuel tube fluidly couples the liquid fuel plenum of the ring manifold to the header manifold. Furthermore, the nozzle assembly includes a second fuel tube extending helically around a portion of the inner fuel tube. The second fuel tube fluidly couples the liquid fuel plenum of the ring manifold to the header manifold.

In another embodiment, the present disclosure is directed to a dual-fuel fuel nozzle assembly. The dual-fuel fuel nozzle assembly includes a center body having a tube shape and a gas fuel plenum defined within the center body. The dual-fuel fuel nozzle assembly also includes a nozzle assembly breach loaded through an end of the center body. The nozzle assembly includes a header manifold and a ring manifold axially spaced from the header manifold. The ring manifold defines a liquid fuel plenum. The nozzle assembly also includes an outer sleeve connected to an aft side wall of the ring manifold and a nozzle body connected to an aft end of the outer sleeve. The ring manifold, the outer sleeve, and the nozzle body define a fluid chamber. The nozzle assembly further includes an inner fuel tube extending axially from the header manifold to the nozzle body. A portion of the inner fuel tube extends helically about an axial centerline of the nozzle assembly between the aft side wall of the ring manifold and the nozzle body. Additionally, the nozzle assembly includes a first fuel tube extending helically around a portion of the inner fuel tube. The first fuel tube fluidly couples the liquid fuel plenum of the ring manifold to the header manifold. Furthermore, the nozzle assembly includes a second fuel tube extending helically around a portion of the inner fuel tube. The second fuel tube fluidly couples the liquid fuel plenum of the ring manifold to the header manifold.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode of practicing various embodiments, is set forth more particularly in the remainder of the specification, including reference to the accompanying figures, in which.

DETAILED DESCRIPTION

Figure 1:
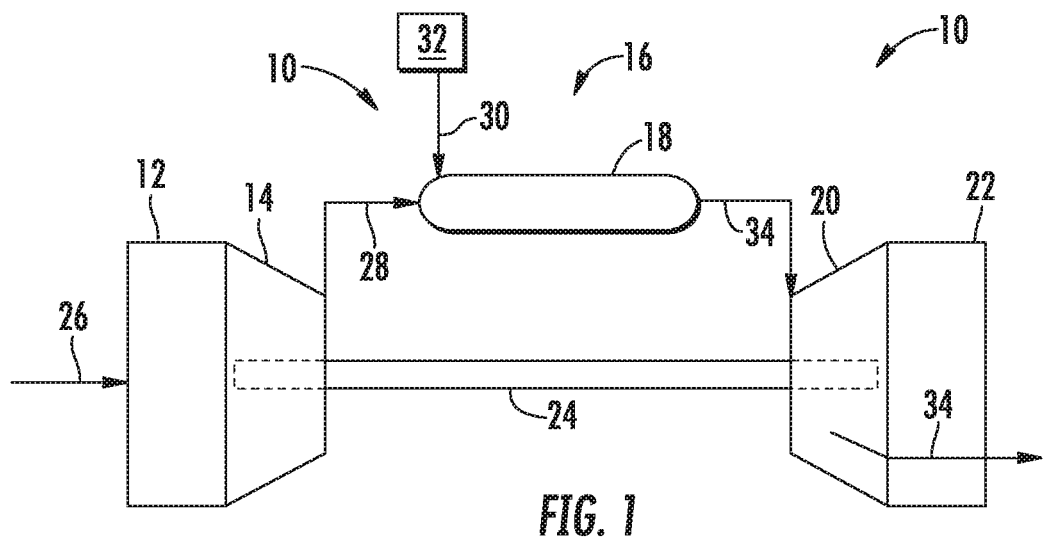
FIG. 1 is a functional block diagram of an exemplary gas turbine as may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a fuel nozzle for a land-based power-generating gas turbine combustor for purposes of illustration, one of ordinary skill in the art will readily appreciate that embodiments of the present disclosure may be applied to any style or type of combustor for a turbomachine and are not limited to combustors or combustion systems for land-based power-generating gas turbines, unless specifically recited in the claims.

Referring now to the drawings, FIG. 1 provides a schematic diagram of an exemplary gas turbine 10. The gas turbine 10 generally includes an inlet section 12, a compressor 14 disposed downstream of the inlet section 12, a combustion system 16 including at least one combustor 18 disposed downstream of the compressor 14, a turbine 20 disposed downstream of the combustor 18 and an exhaust section 22 disposed downstream of the turbine 20. Additionally, the gas turbine 10 may include one or more shafts 24 that couple the compressor 14 to the turbine 20.

During operation, air 26 flows through the inlet section 12 and into the compressor 14 where the air 26 is progressively compressed, thus providing compressed air 28 to the combustor 18. A fuel 30 from a fuel supply 32 is injected into the combustor 18, mixed with a portion of the compressed air 28 and burned to produce combustion gases 34. The combustion gases 34 flow from the combustor 18 into the turbine 20, wherein energy (kinetic and/or thermal) is transferred from the combustion gases 34 to rotor blades (not shown), thus causing shaft 24 to rotate. The mechanical rotational energy may then be used for various purposes such as to power the compressor 14 and/or to generate electricity. The combustion gases 34 exiting the turbine 20 may then be exhausted from the gas turbine 10 via the exhaust section 22.

Figure 2:
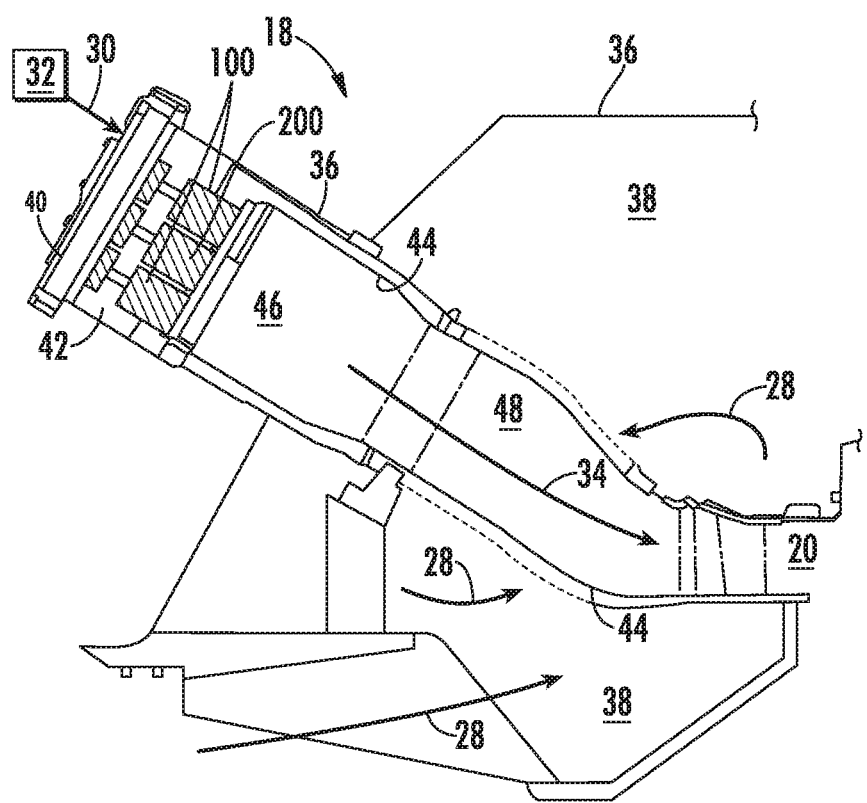
FIG. 2 is a simplified cross-section side view of an exemplary combustor as may incorporate various embodiments of the present disclosure.

FIG. 2 provides a cross-sectioned schematic of an exemplary combustor 18 as may incorporate various embodiments of the present disclosure. As shown in FIG. 2, the combustor 18 may be at least partially surrounded by an outer casing 36, such as a compressor discharge casing. The outer casing 36 may at least partially define a high pressure plenum 38 that at least partially surrounds various components of the combustor 18. The high pressure plenum 38 may be in fluid communication with the compressor 14 (FIG. 1) to receive at least a portion of the compressed air 28 therefrom.

An end cover 40 may be coupled to the outer casing 36. In particular embodiments, the outer casing 36 and the end cover 40 may at least partially define a head end volume or chamber 42 of the combustor 18. In particular embodiments, the head end volume 42 is in fluid communication with the high pressure plenum 38 and/or the compressor 14. One or more liners or ducts 44 may at least partially define a combustion chamber or zone 46 for combusting the fuel-air mixture and may at least partially define a hot gas path 48 through the combustor for directing the combustion gases 34 towards an inlet to the turbine 20.

Figure 3:
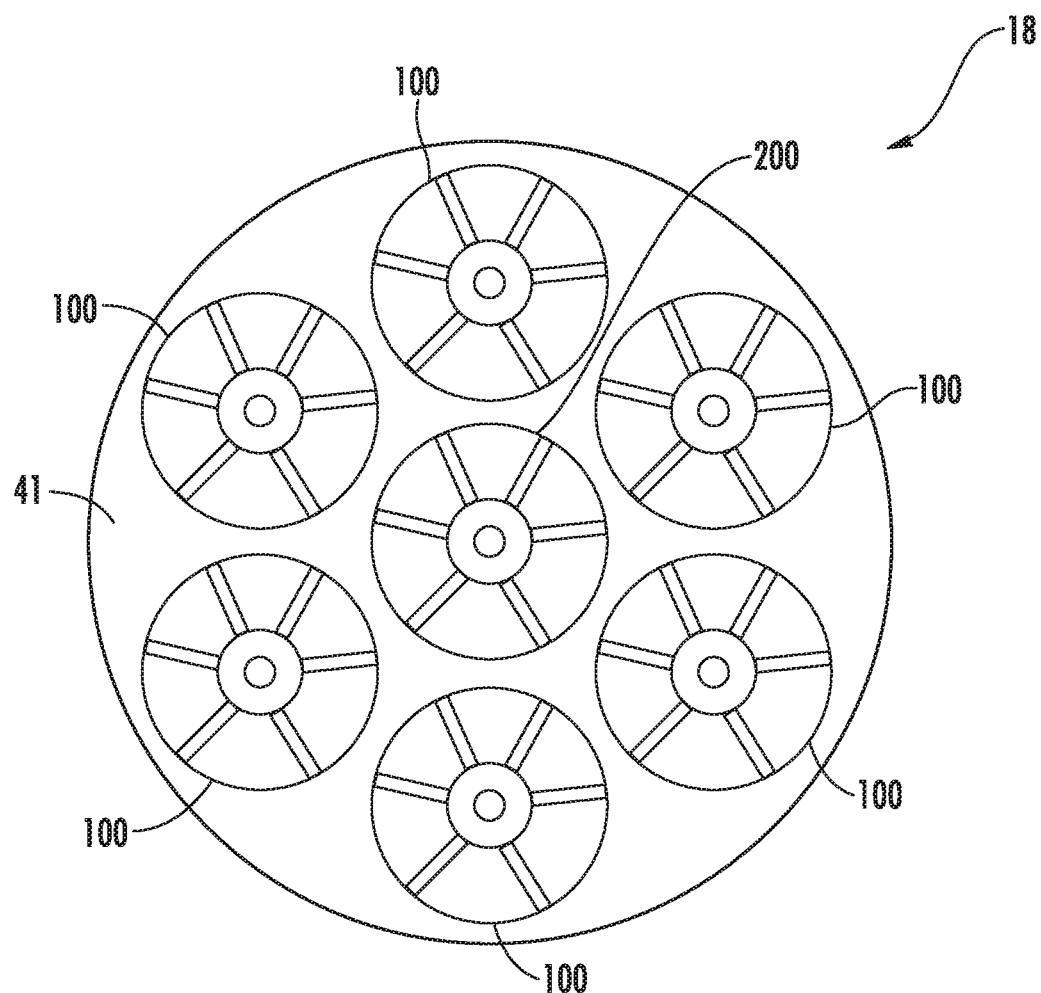
FIG. 3 is an upstream view of a portion of the combustor shown in FIG. 2, according to at least one embodiment of the present disclosure.

FIG. 3 provides an upstream view of a portion of the combustor 18 as shown in FIG. 2. In various embodiments, as shown in FIGS. 2 and 3 collectively, the combustor 18 includes multiple fuel nozzles (e.g., 100) whose upstream ends are coupled to the end cover 40 and which extend toward the combustion chamber 46. The downstream ends of the fuel nozzles are aligned with respective openings (now shown) in a cap assembly 41, such that the fuel nozzles deliver fuel (or a fuel/air mixture) to the combustion chamber.

Various embodiments of the combustor 18 may include different numbers and arrangements of fuel nozzles, and the presently described embodiments are not limited to any particular number of fuel nozzles, unless otherwise specified in the claims. For example, in particular configurations, such as the configuration shown in FIG. 3, the one or more fuel nozzles includes multiple dual-fuel fuel nozzles 100 annularly arranged about a center fuel nozzle 200. In other embodiments, the fuel nozzles 100 may be annularly arranged about a centerline of the end cover 40 without the use of a center fuel nozzle 200. Because the fuel nozzles 100 are radially outward of the centerline of the end cover 40 (and, in some embodiments, the center fuel nozzle 200), the fuel nozzles 100 may be referred to as "outer" fuel nozzles.

In particular embodiments, each outer fuel nozzle 100 is a pre-mix, dual-fuel type fuel nozzle. Each dual-fuel fuel nozzle 100 is configured to inject and premix a gaseous fuel and/or a liquid fuel with a flow of a portion of the compressed air 28 from the head end volume 42 (FIG. 2) upstream from the combustion zone 46. In particular embodiments, the center fuel nozzle 200 is also a pre-mix, dual-fuel (liquid fuel and gas fuel) type fuel nozzle. Other types of fuel nozzles may be used instead of the center fuel nozzle 200, as needs dictate.

Figure 4:
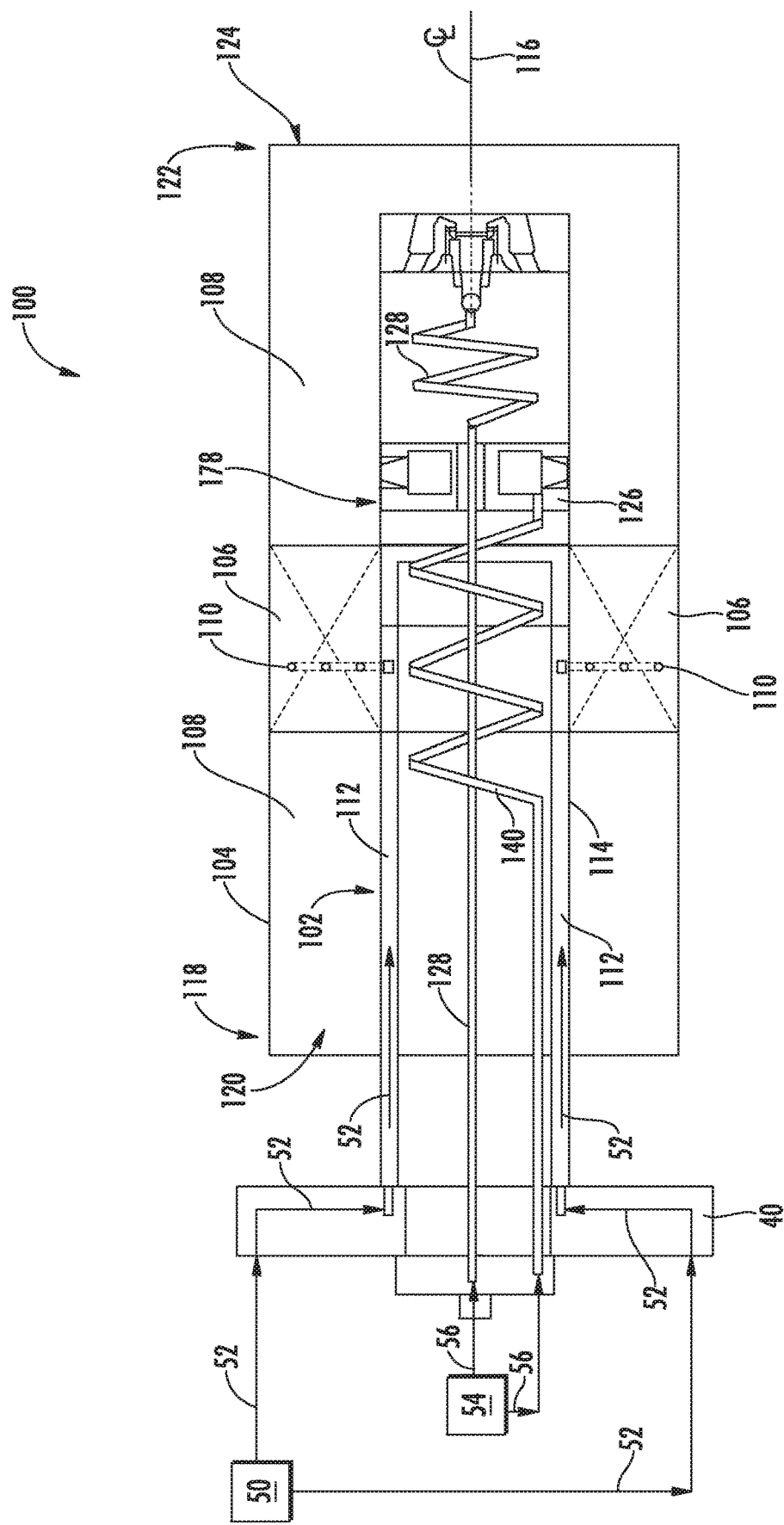
FIG. 4 is a cross-sectioned side view of an exemplary dual-fuel fuel nozzle with pre-mix and dual-fuel capabilities, according to at least one embodiment of the present disclosure.

FIG. 4 provides a cross-sectioned side view of an exemplary dual-fuel fuel nozzle 100 with pre-mix and dual-fuel capabilities, according to at least one embodiment of the present disclosure. In particular embodiments, such as the embodiment shown in FIG. 4, the dual-fuel fuel nozzle 100 includes a center body 102 having an annular or tube shape.

In particular embodiments, the dual-fuel fuel nozzle 100 may include a burner tube 104 that extends circumferentially around at least a portion of the center body 102 and a plurality of turning vanes 106 that extend between the center body 102 and the burner tube 104. The turning vanes 106 are disposed within an annular or premix passage 108 that is defined radially between the center body 102 and the burner tube 104. In particular embodiments, one or more of the turning vanes 106 includes one or more fuel ports 110 that is/are in fluid communication with a gas fuel plenum 112 defined within the center body 102. The gas fuel plenum 112 is fluidly coupled to a gas fuel supply 50 (FIG. 4) to receive a gas fuel 52 therefrom.

As shown in FIG. 4, the center body 102 may be formed from one or more sleeves or tubes 114 that are coaxially aligned with a common longitudinal axis or axial centerline 116 shared by the center body 102 and the dual-fuel fuel nozzle 100. The axial centerline 116 of the center fuel nozzle 200 is coincident with an axial centerline of the end cover 40. The dual-fuel fuel nozzle 100 may be connected to an inner surface of the end cover 40 via mechanical fasteners or by other connecting means (not shown). In particular embodiments, and as shown in FIG. 4, an upstream end portion 118 of the burner tube 104 may at least partially define an inlet 120 to the premix passage 108 and a downstream end portion 122 of the burner tube 104 may at least partially define an outlet 124 of the premix passage 108. In at least one embodiment, the inlet 120 is in fluid communication with the head end volume 42 (FIG. 2) of the combustor 18.

Figure 5:
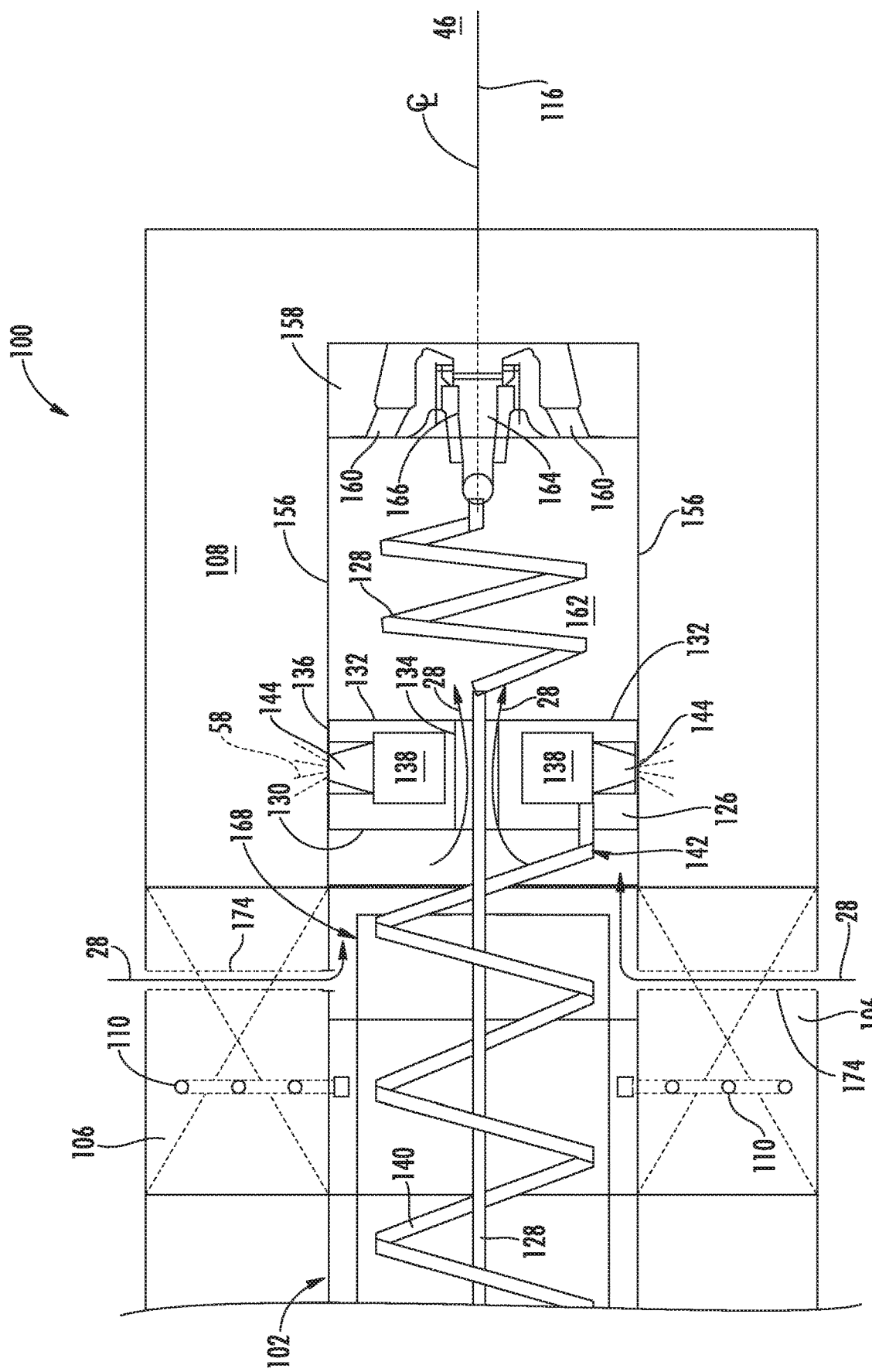
FIG. 5 is an enlarged view of a portion of the dual-fuel fuel nozzle shown in FIG. 4.

FIG. 5 provides an enlarged view of a portion of the dual-fuel fuel nozzle 100 as shown in FIG. 4. In various embodiments, examples of which are shown in FIGS. 4 and 5 collectively, the dual-fuel fuel nozzle 100 includes a ring manifold 126 and an inner fuel tube 128 that extends axially and/or coaxially through the ring manifold 126 with respect to the axial centerline 116. As shown in FIG. 5, the ring manifold 126 includes a forward side wall 130 that is axially spaced from an aft side wall 132 with respect to axial centerline 116. The ring manifold 126 comprises an inner band 134 that is radially spaced from an outer band 136 with respect to axial centerline 116. A liquid fuel plenum 138 is defined within the ring manifold 126 between the inner band 134, the outer band 136, the forward side wall 130, and the aft side wall 132.

In particular embodiments, as detailed in FIGS. 4 and 5 collectively, the liquid fuel plenum 138 is fluidly coupled to a liquid fuel supply 54 via a first fuel tube 140. At least a portion of the first fuel tube 140 extends helically within the center body 102 about or around the inner fuel tube 128 forward of the forward side wall 130 of the ring manifold 126 and is disposed radially inwardly from the gas fuel plenum 112. Referring to FIG. 5, an aft end 142 of the first fuel tube 140 may be connected to the forward side wall 130 and fluidly coupled to the liquid fuel plenum 138 of the ring manifold 126.

The inner band 134 of the ring manifold 126 is detached from the inner tube 128. Rather, the outer band 136 of the ring manifold 126 is attached to the center body 102 and an outer sleeve 156, as described further herein. Thus, in particular embodiments, the inner tube 128 is thermally decoupled from the ring manifold 126, such that the inner tube 128 is unrestrained in its thermal growth or movement through the ring manifold 126.

Figure 6:
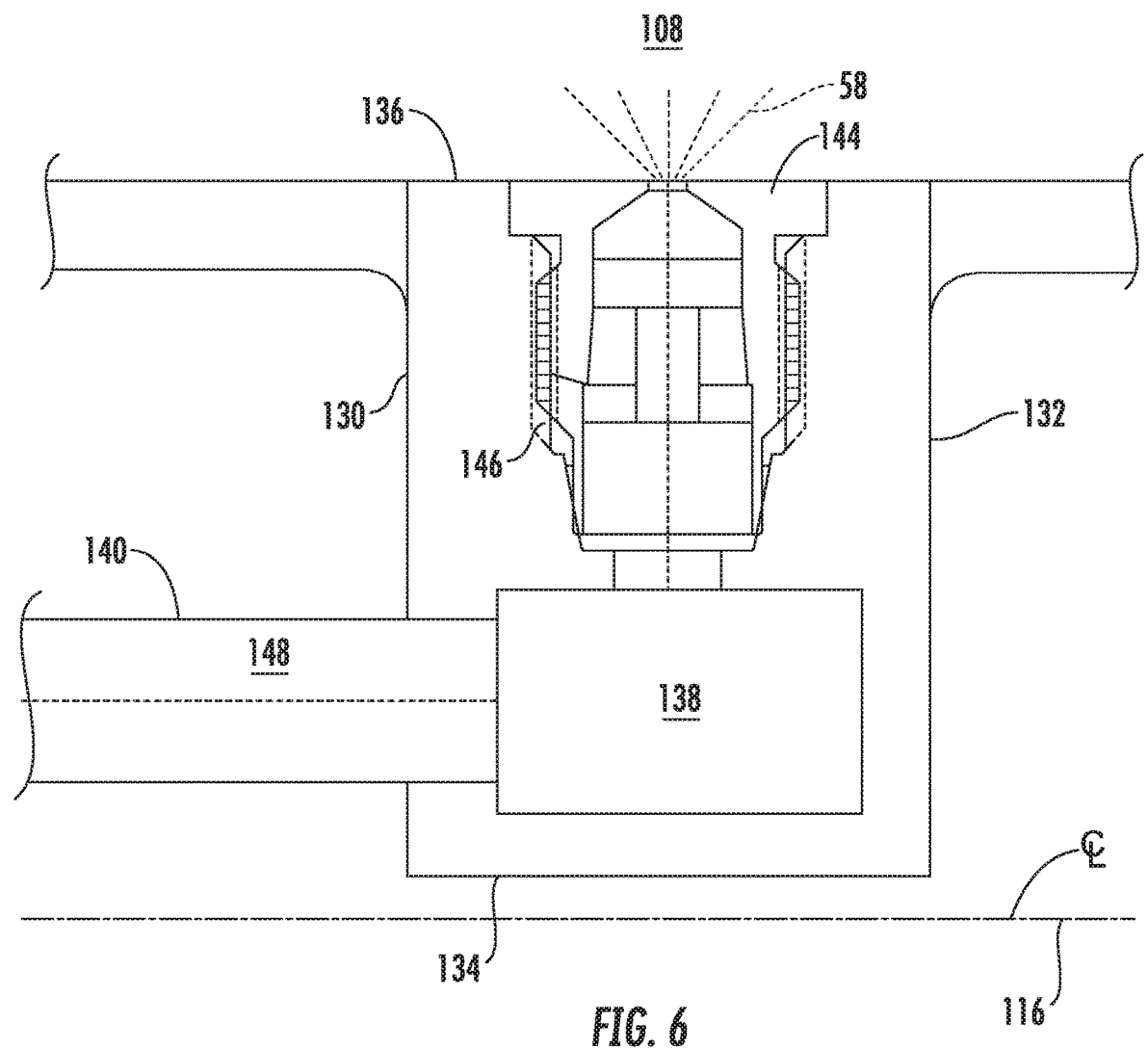
FIG. 6 is an enlarged cross-sectioned side view of a portion the dual-fuel fuel nozzle shown in FIGS. 4 and 5, according to at least one embodiment of the present disclosure.

FIG. 6 provides an enlarged cross-sectioned side view of a portion the center body 102 shown in FIGS. 4 and 5, according to at least one embodiment of the present disclosure. In particular embodiments, such as those shown in FIGS. 5 and 6 collectively, a plurality of radially oriented fuel injectors 144 is circumferentially spaced about/within the outer band 136, each of which is in fluid communication with the liquid fuel plenum 138. Each fuel injector 144 of the plurality of fuel injectors 144 is radially oriented with respect to axial centerline 116 to inject an atomized jet of liquid fuel 56 into the premix passage 108 at a location that is downstream from the turning vanes 106 and/or the fuel ports 110. The atomized jets of liquid fuel are directed in a generally axial direction from the fuel injectors 144, relative to the axial centerline 116.

In particular embodiments, as detailed in FIG. 6, one or more of the radially oriented fuel injectors 144 may be screwed into, threaded into, or otherwise removably attached within a corresponding opening 146 of the ring manifold 126 to facilitate maintenance (e.g., cleaning) and/or replacement, as needed. As shown in FIG. 6, the first fuel tube 140 provides or defines a first fluid passage 148 for passing the liquid fuel 56 from the liquid fuel supply 54 to the liquid fuel plenum 138.

Figure 7:
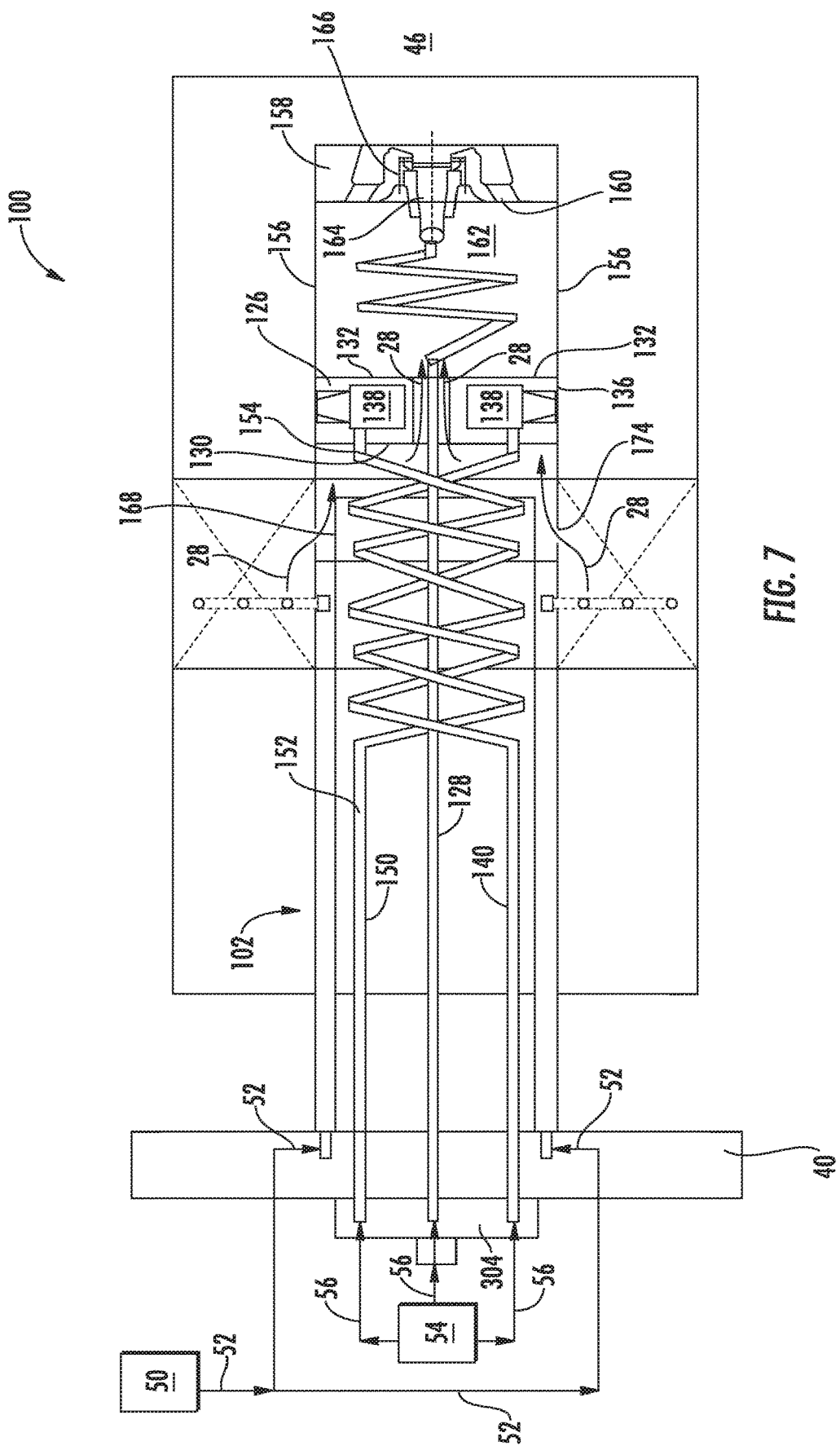
FIG. 7 is a cross-sectioned side view of the dual-fuel fuel nozzle shown in FIGS. 4, 5, and 6, according to at least one embodiment of the present disclosure.

FIG. 7 provides a cross-sectioned side view of the exemplary dual-fuel fuel nozzle 100 shown in FIGS. 4 through 6, according to at least one embodiment of the present disclosure. In particular embodiments, such as the embodiment shown in FIG. 7, the dual-fuel fuel nozzle 100 includes a second fuel tube 150 that defines a second fluid passage 152 for passing the liquid fuel 56 from the liquid fuel supply 54 to the liquid fuel plenum 138. At least a portion of the second fuel tube 150 extends helically within the center body 102 about and/or around the inner fuel tube 128 upstream of the forward side wall 130 of the ring manifold 126 and is disposed radially inwardly from the gas fuel plenum 112. An aft end 154 of the second fuel tube 150 may be connected to the forward side wall 130 and fluidly coupled to the liquid fuel plenum 138 of the ring manifold 126. During operation, the inner fuel tube 128 is unrestrained in its thermal growth or expansion in an axial direction through the ring manifold 126 and with respect to the first fuel tube 140 and the second fuel tube 150.

The first fuel tube 140 and the second fuel tube 150 are coiled to act like a spring. In the illustrated embodiment, the tubes 140, 150 are coiled in the same direction (e.g., clockwise or counter-clockwise). The coiling of the first and second fuel tubes 140, 150 accommodates thermal differences between the liquid fuel supply 54, the compressed air 28 from the head end volume 42, and the gas supply system 50. The first and second fuel tubes 140, 150 do not intersect, but rather are radially outward of, the axial centerline 116 of the dual-fuel fuel nozzle 100. In particular embodiments, the coils of the first and second fuel tubes 140, 150 are wound together and have identical spacing and number of turns. Using tubes 140, 150 that are identical to one another reduces unique part count and reduces manufacturing and assembly complexity.

In particular embodiments, as shown in FIGS. 5 and 7, the center body 102 further comprises an outer sleeve 156. The outer sleeve 156, which may be connected to the outer band 136, extends downstream of the aft side wall 132 of the ring manifold 126. In particular embodiments, such as those shown in FIGS. 5 and 7, a nozzle body or disk 158 is connected to the outer sleeve 156 downstream from the aft side wall 132 of the ring manifold 126. The nozzle body 158 extends radially and circumferentially within the outer sleeve 156 with respect to axial centerline 116. The nozzle body 158 defines a plurality of apertures 160. The aft side wall 132 of the ring manifold 126, the outer sleeve 156, and the nozzle body 158 collectively define a fluid chamber 162 within the outer sleeve 156. The plurality of apertures 160 is in fluid communication with the fluid chamber 162. The fluid chamber 162 may be in fluid communication with a compressed air or diluent supply such as the head end volume 42 and/or the high pressure plenum 38 (FIG. 2).

In particular embodiments, as shown in FIGS. 5 and 7, the nozzle body 158 includes a fuel injector 164. The fuel injector 164 is axially oriented with respect to axial centerline 116 and is in fluid communication with the liquid fuel supply 54 via the inner fuel tube 128. In operation, the fuel injector 164 injects atomized liquid fuel 56 into the combustion zone 46 at a location that is downstream from the turning vanes 106 and downstream from the plurality of radially oriented fuel injectors 144. In particular embodiments, the fuel injector 164 may be screwed into, threaded into, or otherwise removably attached within a corresponding opening 166 of the nozzle body 158 to facilitate maintenance (e.g., cleaning) and/or replacement, as needed.

In various embodiments, as shown in FIGS. 5 and 7, a portion of the inner fuel tube 128 that is disposed within the fluid chamber 162 extends helically about the axial centerline 116 of the dual-fuel fuel nozzle 100 between the aft side wall 132 of the ring manifold 126 and the nozzle body 158. In operation, the helical portion of the inner fuel tube acts as a spring to allow the inner fuel tube to grow and contract due to thermal differences between the liquid fuel supply 54, the compressed air 28 from the head end volume 42 and the gas supply system 50.

Figure 8:
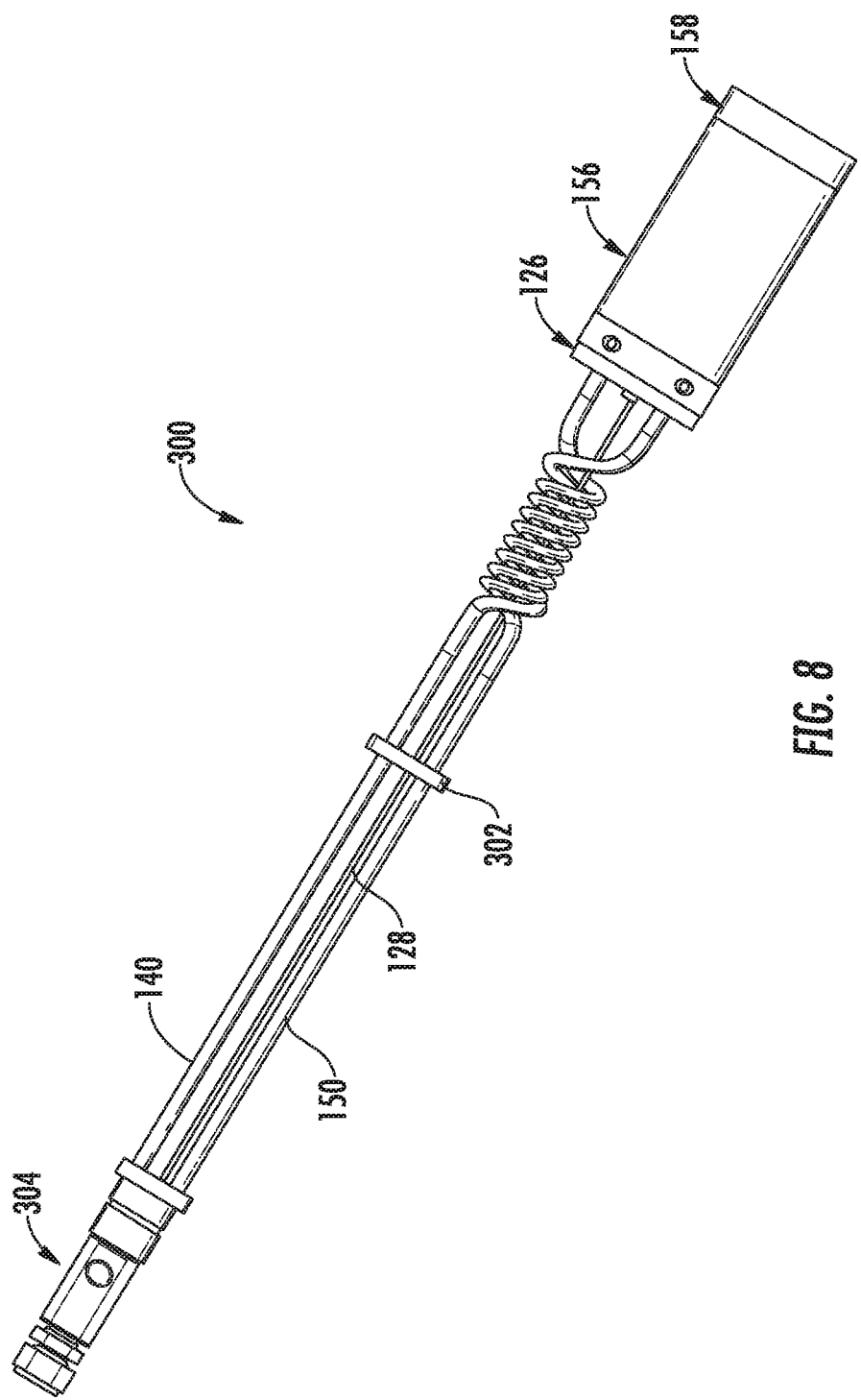
FIG. 8 is a side view of a nozzle assembly of the dual-fuel fuel nozzle shown in FIG. 7, according to at least one embodiment of the present disclosure.

FIG. 8 provides a side view of a nozzle assembly of the dual-fuel fuel nozzle 100 shown in FIG. 7, according to at least one embodiment. As shown in FIG. 8, the nozzle body 158, the outer sleeve 156, the ring manifold 126, the inner fuel tube 128, the first fuel tube 140, and the second fuel tube 150 may be provided as a nozzle assembly 300. The nozzle assembly 300 may further include a baffle or tube support member 302 that provides radial support to one or more of the inner fuel tube 128, the first fuel tube 140 and the second fuel tube 150. The nozzle assembly 300 may also include a fuel manifold 304 that fluidly couples the inner fuel tube 128, the first fuel tube 140, and the second fuel tube 150 to the liquid fuel supply 54. As shown in FIG. 7, the fuel manifold 304 may be connected to and/or extend axially through the end cover 40. The nozzle assembly 300 may be breach loaded through and connected to a downstream end 178 (FIG. 4) of the center body 102. In particular embodiments, neither the first fuel tube 140 nor the second fuel tube 150 intersect an axial centerline 306 of the fuel nozzle assembly 300.

In particular embodiments, as shown in FIG. 5, the dual-fuel fuel nozzle 100 may include an air shield or deflector 168 that extends circumferentially around the inner fuel tube 128 and the first fuel tube 140 or as shown in FIG. 7, extends circumferentially around the inner fuel tube 128, the first fuel tube 140 and the second fuel tube 150. As shown in FIGS. 5 and 7 collectively, the air shield 168 is positioned upstream from the forward side wall 130 of the ring manifold 226.

Figure 9:
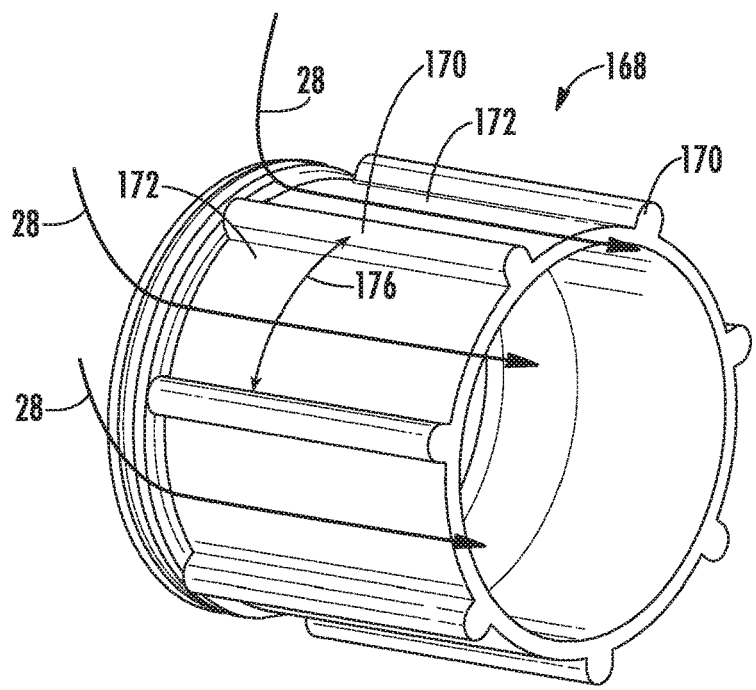
FIG. 9 is a perspective view of an exemplary air shield, according to at least one embodiment of the present disclosure.
Figure 10:
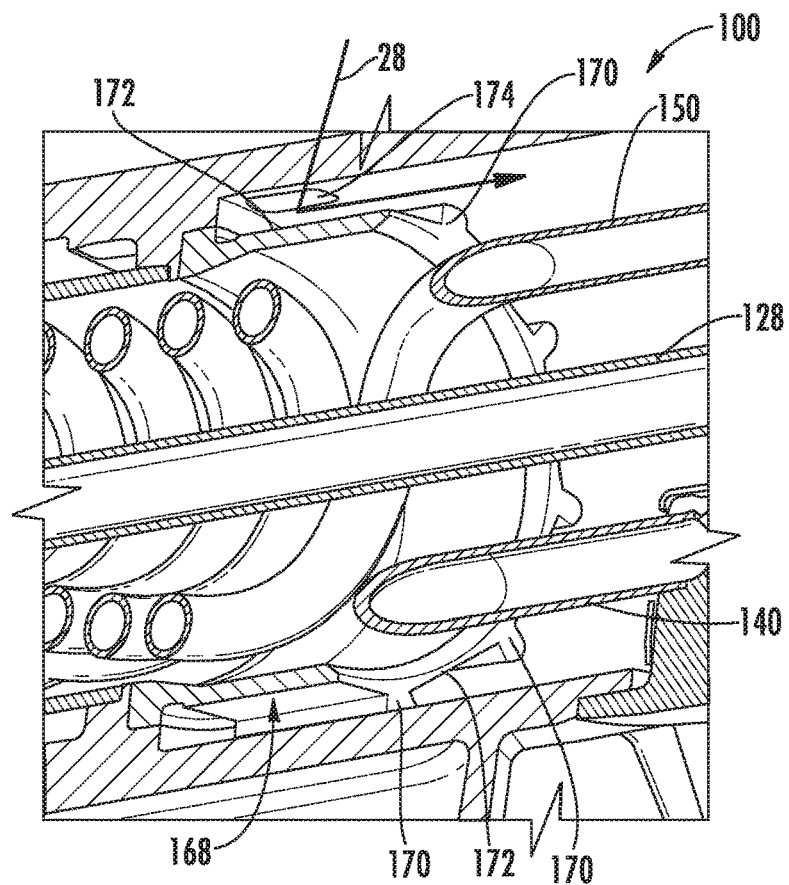
FIG. 10 is a cross-sectioned perspective view of a portion of the dual-fuel fuel nozzle shown in FIG. 7 including the air shield shown in FIG. 9, according to at least one embodiment of the present disclosure.

FIG. 9 provides a perspective view of an exemplary air shield 168 according to at least one embodiment of the present disclosure. FIG. 10 provides a cross-sectioned perspective view of a portion of the dual-fuel fuel nozzle 100 with the air shield 168 installed. As shown in FIGS. 9 and 10 collectively, the air shield 168 may include a plurality of protrusions or ribs 170 that extend radially outwardly from an outer surface 172 of the air shield 168.

In operation, as illustrated in FIGS. 9 and 10 collectively, compressed air 28 from the head end chamber 42 enters the center body 102 via a plurality of apertures 174 defined by the turning vanes 106 (FIG. 5). As the compressed air 28 strikes the outer surface 172 of the air shield 168, it stagnates. The ribs 170 create flow channels 176 that straighten the high velocity, high temperature, swirling compressed air 28 and that direct the air 28 in an axial direction. The straightening of the streams of compressed air 28 helps to ensure that the compressed air 28 does not impinge directly on the inner fuel tube 128, the first fuel tube 140, and/or the second fuel tube 150. Additionally, straightening the streams of compressed air 28 lowers the peak velocity of the compressed air 28, thus reducing the heat transfer from the compressed air 28 into the inner fuel tube 128, the first fuel tube 140, and/or the second fuel tube 150 that are carrying the liquid fuel 56. This deflection of the compressed air 28 keeps the internal surfaces, which may be wetted with liquid fuel, from experiencing temperatures that are sufficiently high to result in thermal breakdown of the fuel and subsequent coke formation, particularly when the liquid fuel 56 is not moving therethrough at a sufficient velocity. The compressed air 28 may then flow through and/or around various openings defined by and/or around the ring manifold 126 and into the fluid chamber 162, thereby providing cooling and/or purge air to the nozzle body 158.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A nozzle assembly, comprising:
   a fuel manifold upstream of a downstream end of an end cover;
   a ring manifold axially spaced from the fuel manifold, the ring manifold defining a liquid fuel plenum;
   an outer sleeve connected to an aft side wall of the ring manifold;
   a nozzle body connected to an aft end of the outer sleeve, wherein the ring manifold, the outer sleeve, and the nozzle body define a fluid chamber;
   an inner fuel tube extending axially from the fuel manifold through the end cover and the ring manifold to the nozzle body, a radial gap defined between the ring manifold and the inner fuel tube, the radial gap extending axially from a forward side wall of the ring manifold to the aft side wall of the ring manifold, wherein a portion of the inner fuel tube extends helically about an axial centerline of the nozzle assembly between the aft side wall of the ring manifold and the nozzle body;
   a first fuel tube extending axially from the fuel manifold through the end cover to the ring manifold, the first fuel tube further extending helically around a portion of the inner fuel tube and connected to the ring manifold radially outward of the radial gap, wherein the first fuel tube fluidly couples the liquid fuel plenum of the ring manifold to the fuel manifold to supply liquid fuel to at least one injector in the ring manifold; and a second fuel tube extending axially from the fuel manifold to the ring manifold, the second fuel tube further extending helically around a portion of the inner fuel tube, wherein the second fuel tube fluidly couples the liquid fuel plenum of the ring manifold to the fuel manifold.

2. The nozzle assembly as in claim 1, further comprising an axially oriented fuel injector mounted in an opening of the nozzle body, wherein the axially oriented fuel injector is fluidly coupled to the inner fuel tube.

3. The nozzle assembly as in claim 2, wherein the axially oriented fuel injector is removably mounted within the opening of the nozzle body.

4. The nozzle assembly as in claim 1, further comprising a plurality of radially oriented fuel injectors circumferentially spaced along an outer band of the ring manifold, wherein the plurality of radially oriented fuel injectors is in fluid communication with the liquid fuel plenum.

5. The nozzle assembly as in claim 4, wherein each of the radially oriented fuel injectors of the plurality of radially oriented fuel injectors is removably mounted in a respective opening defined in the ring manifold.

6. The nozzle assembly as in claim 4, further comprising a plurality of turning vanes positioned upstream of the plurality of radially oriented fuel injectors.

7. The nozzle assembly as in claim 1, further comprising a tube support member coupled to the inner fuel tube, the first fuel tube and the second fuel tube.

8. The nozzle assembly as in claim 1, wherein an aft end of the first fuel tube is connected to a forward side wall of the ring manifold.

9. The nozzle assembly as in claim 8, wherein an aft end of the second fuel tube is connected to the forward side wall of the ring manifold.

10. The nozzle assembly as in claim 1, wherein the inner fuel tube is axially unrestrained by the ring manifold.

11. The nozzle assembly as in claim 1, wherein the first fuel tube and the second fuel tube are radially outward of the axial centerline of the nozzle assembly.

12. The nozzle assembly as in claim 1, wherein coils of the first fuel tube and the second fuel tube are wound together with identical spacing and numbers of turns.

13. A dual-fuel fuel nozzle assembly, comprising:
a center body having a tube shape;
a gas fuel plenum defined within the center body; and
a nozzle assembly breach loaded through an end of the center body, wherein the nozzle assembly comprises:
a fuel manifold upstream of a downstream end of an end cover;
a ring manifold axially spaced from the fuel manifold, the ring manifold defining a liquid fuel plenum;
an outer sleeve connected to an aft side wall of the ring manifold;
a nozzle body connected to an aft end of the outer sleeve, wherein the ring manifold, the outer sleeve, and the nozzle body define a fluid chamber;
an inner fuel tube extending axially from the fuel manifold through the end cover and the ring manifold to the nozzle body, a radial gap defined between the ring manifold and the inner fuel tube, the radial gap extending axially from a forward side wall of the ring manifold to the aft side wall of the ring manifold, wherein a portion of the inner fuel tube extends helically about an axial centerline of the nozzle assembly between the aft side wall of the ring manifold and the nozzle body;
a first fuel tube extending axially from the fuel manifold through the end cover to the ring manifold, the first fuel tube further extending helically around a portion of the inner fuel tube and connected to the ring manifold radially outward of the radial gap, wherein the first fuel tube fluidly couples the liquid fuel plenum of the ring manifold to the fuel manifold to supply liquid fuel to at least one injector in the ring manifold; and
a second fuel tube extending axially from the fuel manifold to the ring manifold, the second fuel tube further extending helically around a portion of the inner fuel tube, wherein the second fuel tube fluidly couples the liquid fuel plenum of the ring manifold to the fuel manifold.

14. The dual-fuel fuel nozzle assembly as in claim 13, wherein the nozzle assembly further comprises an axially oriented fuel injector mounted in an opening of the nozzle body, wherein the axially oriented fuel injector is fluidly coupled to the inner fuel tube.

15. The dual-fuel fuel nozzle assembly as in claim 14, wherein the axially oriented fuel injector is removably mounted within the opening of the nozzle body.

16. The dual-fuel fuel nozzle assembly as in claim 13, wherein the nozzle assembly further comprises a plurality of radially oriented fuel injectors circumferentially spaced along an outer band of the ring manifold; wherein the plurality of radially oriented fuel injectors is in fluid communication with the liquid fuel plenum; and wherein each of the radially oriented fuel injectors of the plurality of radially oriented fuel injectors is removably mounted in a respective opening defined in the ring manifold.

17. The dual-fuel fuel nozzle assembly as in claim 16, further comprising a plurality of turning vanes positioned upstream of the plurality of radially oriented fuel injectors.

18. The dual-fuel fuel nozzle assembly as in claim 13, wherein the inner fuel tube is axially unrestrained by the ring manifold.

19. The dual-fuel fuel nozzle assembly as in claim 13, wherein the first fuel tube and the second fuel tube are radially outward of the axial centerline of the center body; and wherein an aft end of the first fuel tube and an aft end of the second fuel tube are connected to a forward side wall of the ring manifold.

20. The dual-fuel fuel nozzle assembly as in claim 13, wherein coils of the first fuel tube and the second fuel tube are wound together with identical spacing and numbers of turns.

* * * * *